Nov. 30, 1943.  A. D. ANDREEF  2,335,629
TENNIS RACKET,
Filed Sept. 23, 1941  2 Sheets-Sheet 1
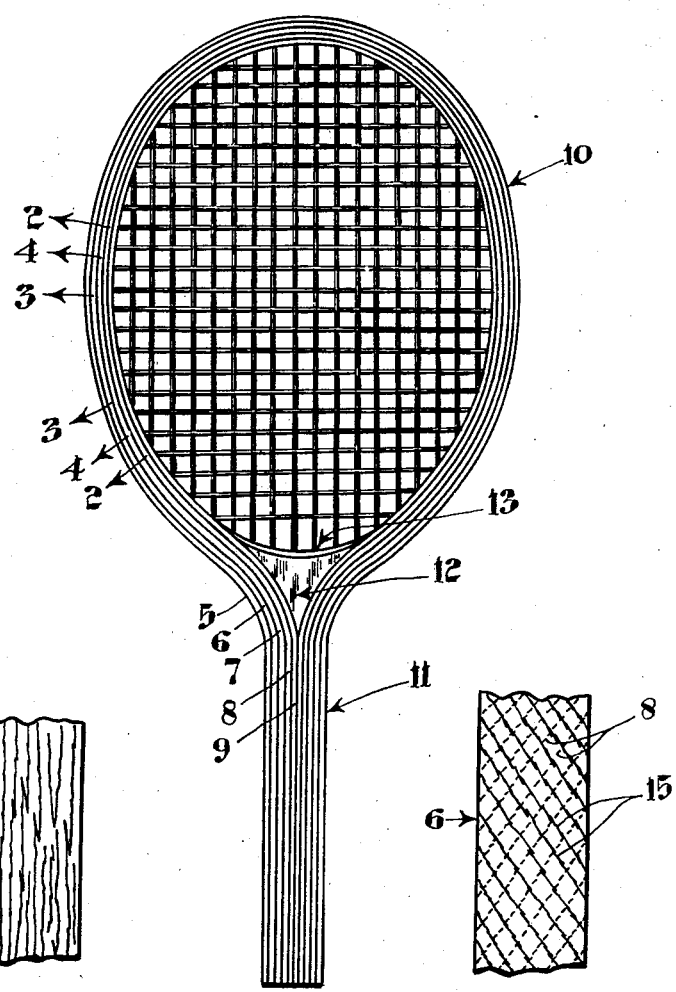
FIG.1
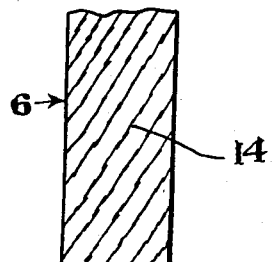
FIG.2
FIG.3
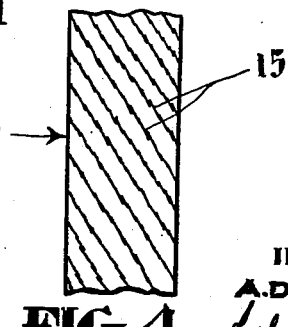
FIG.5
FIG.4
INVENTOR
A.D.ANDREEF
By Fetherstonhaugh & Co.
ATTORNEYS Patented Nov. 30, 1943

2,335,629

UNITED STATES PATENT OFFICE 2,335,629

TENNIS RACKET

Alexis D. Andreef, Montreal, Quebec, Canada

Application September 23, 1941, Serial No. 412,007

5 Claims. (Cl. 273—73)

This invention relates to tennis and similar rackets of the laminated type, the principal object being to provide a generally improved racket of substantially increased resiliency and breakage resistance as compared with rackets made in accordance with conventional practice.

According to one feature of this invention a plurality of longitudinally grained plies are combined with a plurality of bias cut transversely grained plies in the building up of the head or both the head and handle portions of the racket. The bias cut plies are reversely arranged with respect to each other so that the obliquely inclined grain of one such ply crosses the obliquely inclined grain of the companion ply. The bias cut plies should be at least two in number and are preferably appreciably thinner than the longitudinally grained plies with which they are combined. This particular combination of conventional longitudinally grained plies with bias cut reversely arranged transversely grained plies materially increases the resistance of the racket to warpage cracking and splitting.

Another feature of the invention resides in the provision of a racket in which only the upper portion of the head is formed by the aforesaid combination of longitudinally grained and bias cut transversely grained plies, the lower portion of the head and handle being formed solely by longitudinally grained plies. In this embodiment of the invention the bias cut transversely grained plies are incorporated in the upper portion of the head so that the ends of these plies extend downwardly only a relatively short distance below the central transverse axis of the head.

Another feature of the invention resides in the provision of a racket in which the laminated inside crescent shaped reinforcement usually provided at the throat portion is replaced by a single ply which extends around the entire inner periphery of the head and has its end portions overlapped at the throat and shoulder portions of the head. In the conventional racket the flexing of the head produces severe stresses on the conventional inside crescent reinforcement with the result that the latter tends to separate from the heart piece and the inside shoulder portions of the head to which it is glued. The replacement of this crescent shaped reinforcement by the previously mentioned inside ply not only eliminates this difficulty but provides an improved racket in which the shoulder portion is materially strengthened against breakage due to flexing or bending of the head.

Another feature of the invention consists in the provision of a racket in which the throat strengthening effect of the aforesaid inside head ply is supplemented by two additional shoulder reinforcing plies which are incorporated in the shoulder portion of the racket so that they also extend downwardly into the handle portion. In a preferred embodiment of the invention the upper ends of these additional shoulder reinforcing plies extend upwardly to within a short distance of the transverse axis of the head where they meet the lower ends of one of two bias cut transversely grained head reinforcing plies which are incorporated in the upper portion only of the head as previously described.

Proceeding now to a more detailed description reference will be had to the accompanying drawings wherein:

Figure 1 is an elevation of a tennis racket exemplifying one embodiment of my invention.

Figure 2 is a sectional view taken along the line 2—2 of Figure 1 and shows a fragmentary portion of one of the straight grained plies.

Figure 3 is a sectional view taken along the line 3—3 of Figure 1 and shows a fragmentary portion of one of the bias cut transversely grained plies.

Figure 4 is a view taken along the line 4—4 of Figure 1 and shows a fragmentary portion of a second bias cut transversely grained ply.

Figure 5 is a view illustrating the manner in which the transversely grained plies shown in Figures 3 and 4 are reversely arranged so that the obliquely inclined grain of one ply crosses the obliquely inclined grain of the companion bias cut ply.

Figure 6:
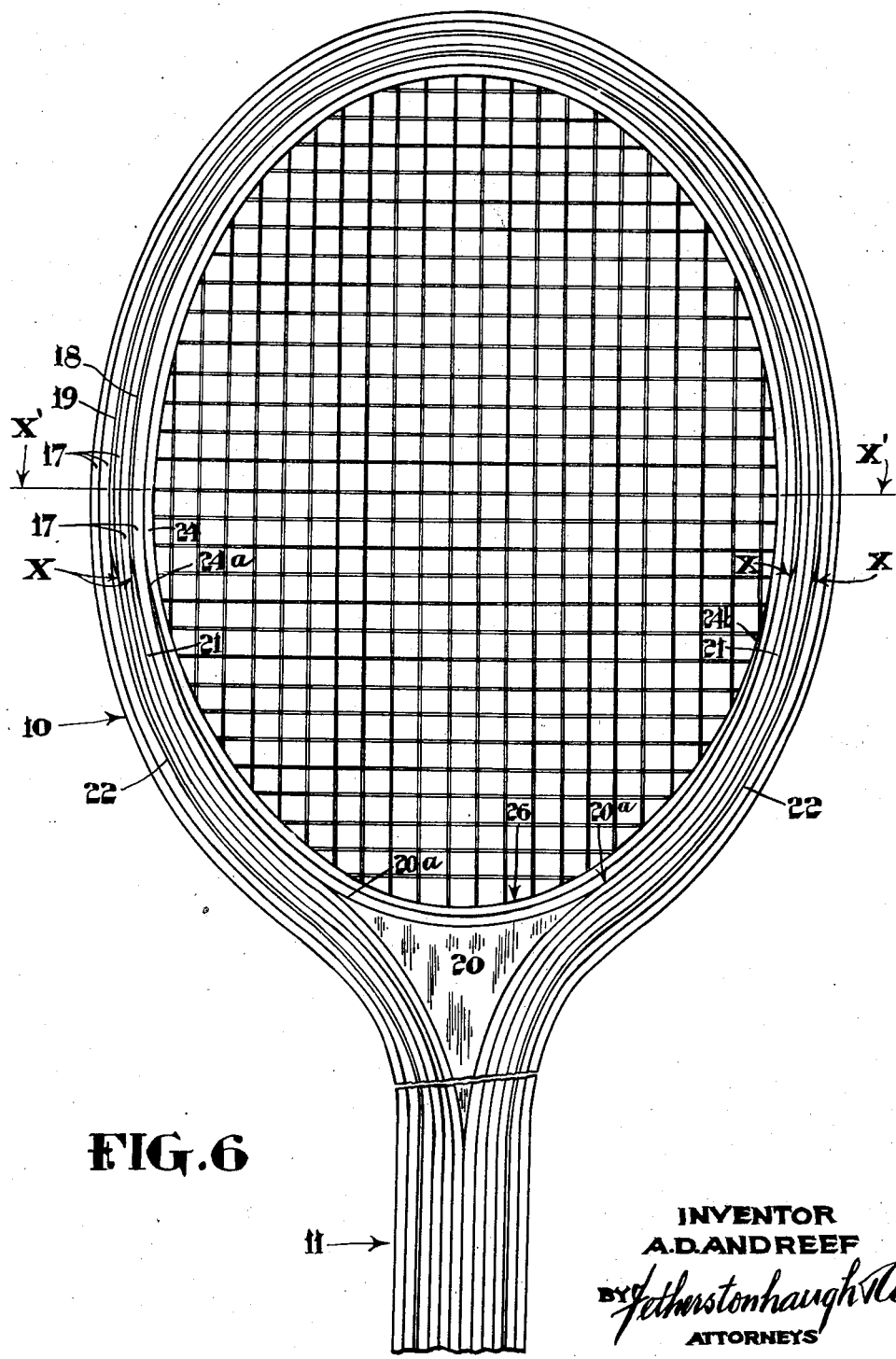
Figure 6 is a view similar to Figure 5 but showing another embodiment of the invention.

The racket shown in Fig. 1 is formed by bending and gluing together a plurality of plies indicated at 5, 6, 7, 8 and 9 to form an ovel head 10 and a handle 11. A conventional heart piece and a conventional inside crescent shaped throat reinforcement are respectively indicated at 12 and 13. The plies 5, 7 and 9 are conventional straight grained plies but the plies 6 and 8 are bias cut transversely grained plies which provide effective reinforcement against warpage, cracking and splitting of the frame and handle portions. The plies 6 and 8 are reversely arranged so that the obliquely inclined grain 14 of the ply 6 crosses and forms a herring-bone grain pattern with the oppositely inclined grain 15 of the companion bias cut ply 8. It may be noted here that the grain of each of the bias cut plies 6 and 8 is relatively long compared with the grain of an ordinary cross grained ply in which the grain extends across the plies at right angles to the sides thereof. This extra length of grain plus the reverse arrangement of the bias cut plies 6 and 8 provides, in a racket of the type shown in Fig. 1, greater resistance against warpage, splitting and cracking than is obtained in rackets of the type in which longitudinally grained plies are combined with transversely grained plies whose grain is at right angles to the grain of the longitudinally grained plies.

In the construction shown in Fig. 6 the head and handle portions of the racket are formed, in part, by a plurality of straight grained plies 17 corresponding to the plies 5, 7, and 9 of Fig. 1. The upper portion of the head is also reinforced against warpage, cracking and splitting by the incorporation therein of two reversely arranged bias cut transversely grained plies 18 and 19 corresponding, respectively, to the plies 6 and 8 of Fig. 1. In this case, however, the bias cut plies 18 and 19 are made relatively short and are arranged so that they extend across the top and downwardly along the sides of the head to points X located a relatively short distance below the minor or transverse axis X' of the head. In other words, the lower ends of the bias cut plies 18 and 19 are located a relatively short distance from the axis X' and a relatively greater distance from the upper corners 20a of the heart piece 20. The lower ends of the bias cut ply 18 meet the upper tapered ends of two relatively thick shoulder reinforcing plies 21 which extend downwardly through both the shoulder and handle portions of the racket. The lower ends of the remaining bias cut ply 19 meet the upper ends of two relatively thin shoulder and handle reinforcing plies 22 which are located outside the shoulder reinforcing plies 21 and which also extend downwardly through both the shoulder and handle portions of the racket. In the racket shown in Fig. 6 the previously mentioned conventional inside crescent-shaped reinforcement 13 is replaced by an inside ply or lamination 24 which extends entirely around the inner periphery of the head, the end portions 24a and 24b of said lamination being tapered and overlapped to provide a two-ply throat bridging portion 26 which covers and is cemented to the top of the heart piece 20. Since the inside pily 24 is a straight grained ply which is cemented to the adjacent straight grained ply 17, the head of the racket may be subjected to considerable flexing or bending stresses without causing the ply 24 to separate from the heart piece 20 or from the adjacent ply 17. The shoulder reinforcing plies 21 and 22 are straight grained plies through which stresses imposed on the shoulder portions of the racket by the bending of the head are transmitted to the handle portion of the racket in such a way as to assist the inside lamination 24 in preventing the breakage or separation of the plies in the shoulder portions of the racket which frequently occurs in the case of a conventional racket provided with an inside crescent reinforcement.

Having thus described my invention, what I claim is:

1. A laminated tennis or similar racket in which at least the upper portion of the head is formed by straight grained plies and bias cut transversely grained plies, there being at least two bias cut plies reversely arranged so that the obliquely inclined grain of one bias cut ply crosses the grain of the next adjacent reversely arranged bias cut ply, the inside periphery of the head being formed by a single thin wood ply having its end portion glued together in overlapping relation to provide a throat bridging portion of double thickness, said last mentioned ply being glued to the heart piece and to an adjacent head forming ply of the racket.

2. A laminated tennis or similar racket comprising head and handle portions, the head portion including a plurality of straight grained plies which extend into the handle portion and at least two adjacently positioned bias cut transversely grained plies which extend across the top and downwardly along the sides of the head and terminating at points located a relatively short distance below the transverse axis of the head, said bias cut plies being reversely arranged so that the obliquely inclined grain of one bias cut ply crosses the grain of the next adjacent reversely arranged bias cut ply, the portion of the head located below the lower ends of the bias cut plies being provided with straight grained shoulder reinforcing plies which extend downwardly from the said lower ends of the bias cut plies through the shoulder forming portions of the head and into said handle portion.

3. A racket as set forth in claim 2 in which the inside periphery of the head is formed by a single thin, glued-in-place wood ply having overlapping end portions disposed to form that portion of the inside periphery of the head which lies below the lower ends of said bias cut lamination.

4. A laminated tennis or similar racket comprising head and handle portions consisting of thin plies of wood glued together, the head portion including both straight grained plies and bias cut transversely grained plies, there being at least two adjacently positioned bias cut plies reversely arranged with respect to each other so that the obliquely inclined grain of one bias cut ply crosses the grain of the next adjacent reversely arranged bias cut ply, said straight grained plies forming part of the top, side and shoulder portions of the head and being extended into the handle portion to form part of the latter, said bias cut plies being shorter than said straight grained plies and being arranged to extend across the top and downwardly along the sides of the head and terminating at points located a relatively short distance below the transverse axis of the head, the portion of the head located below the lower ends of the bias cut plies being provided with two straight grained shoulder reinforcing plies which extend downwardly from the said lower ends of the bias cut plies through the shoulder portions of the head and into said handle portion, the inside periphery of the head being formed by a single glued-in-place wood ply having overlapped end portions disposed to form that portion of the inside periphery of the head which lies below the lower ends of said bias cut laminations.

5. A racket as set forth in claim 4 in which a heart piece is fitted in the throat portion of the racket and in which the single ply forming the inside periphery of the head is a straight grained lamination which is glued to the heart piece and to one of the previously mentioned straight grained head and handle forming laminations.

ALEXIS D. ANDREEF.